No. 886,460. PATENTED MAY 5, 1908.
B. AIKMAN.
AUTOMATIC BRAKING SYSTEM.
APPLICATION FILED OCT. 15, 1906.
3 SHEETS—SHEET 2.
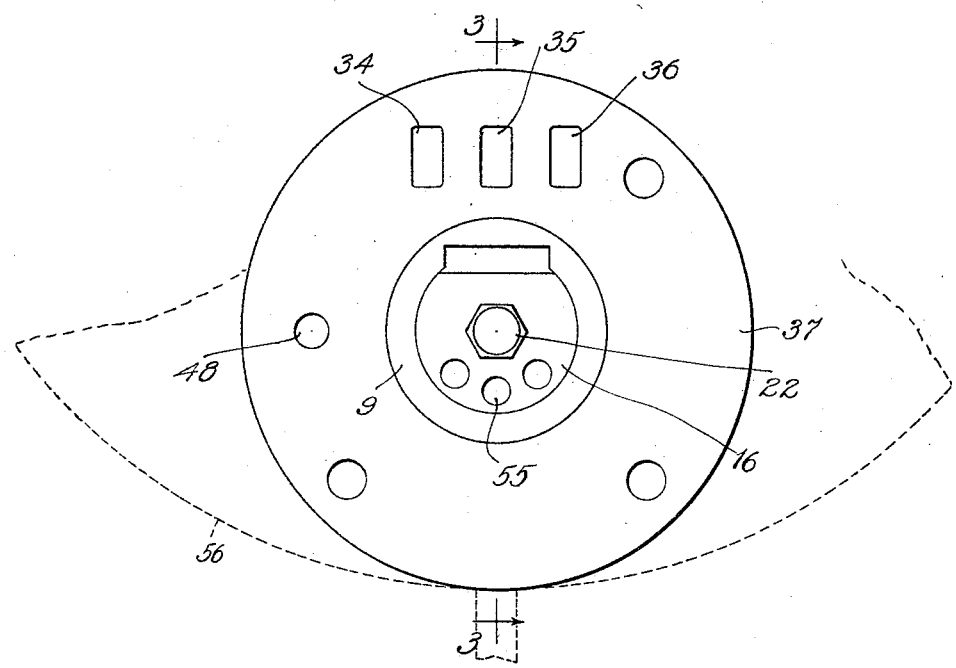
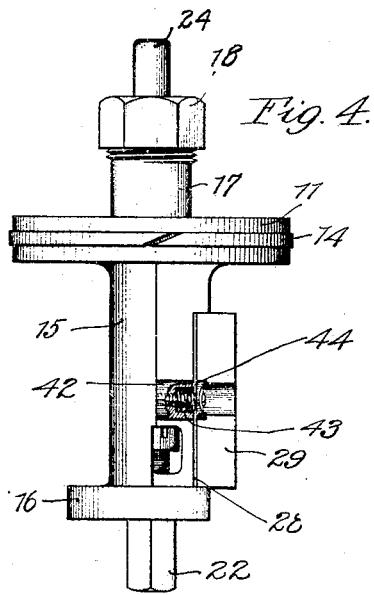
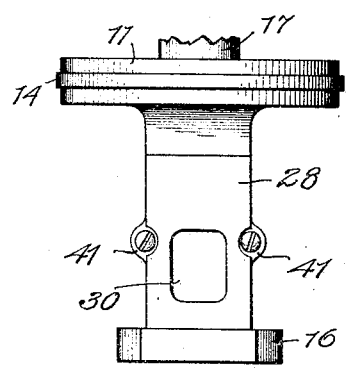
Witnesses
Inventor
Bert Aikman
By Charles A. Brown
Attorney

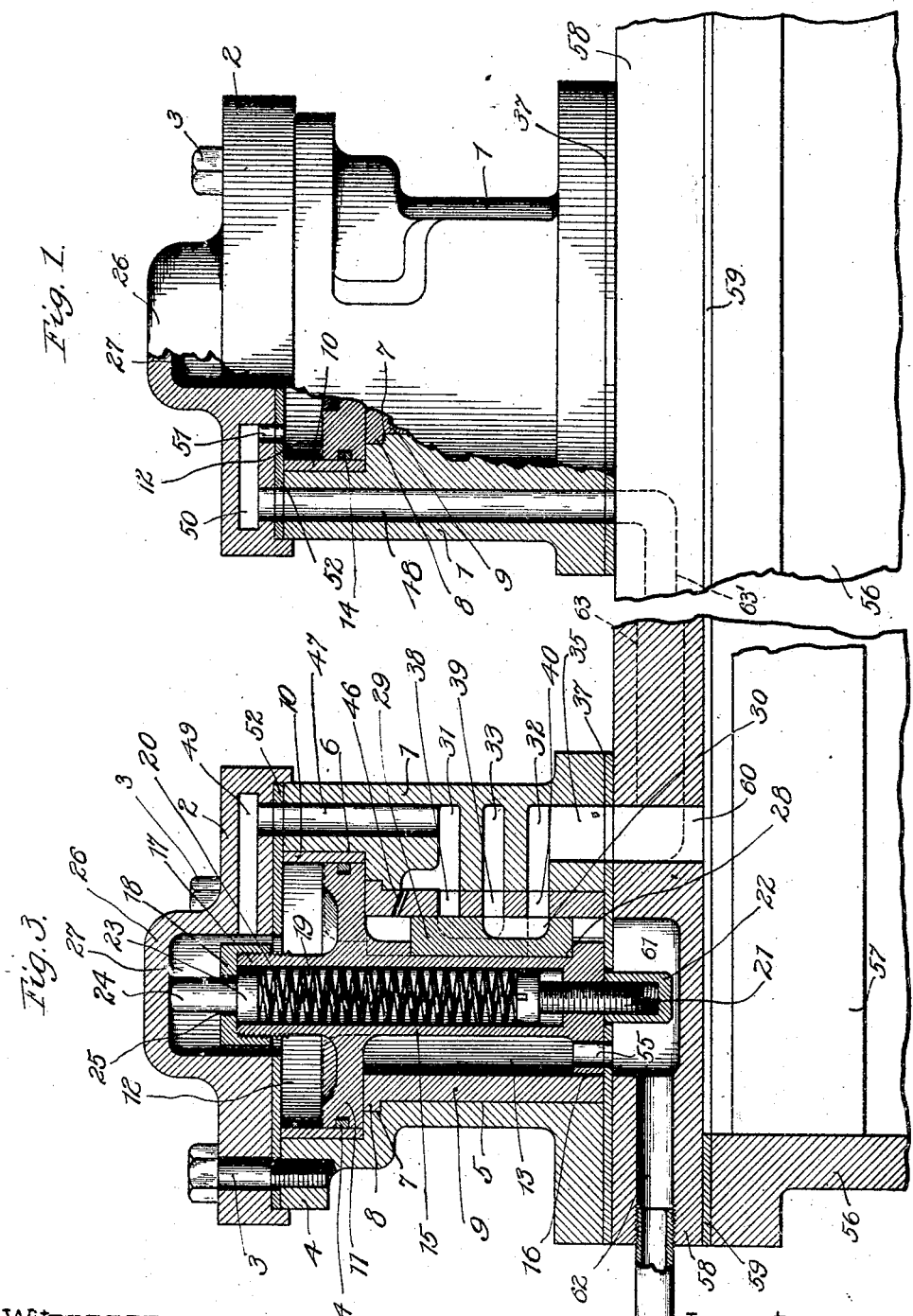

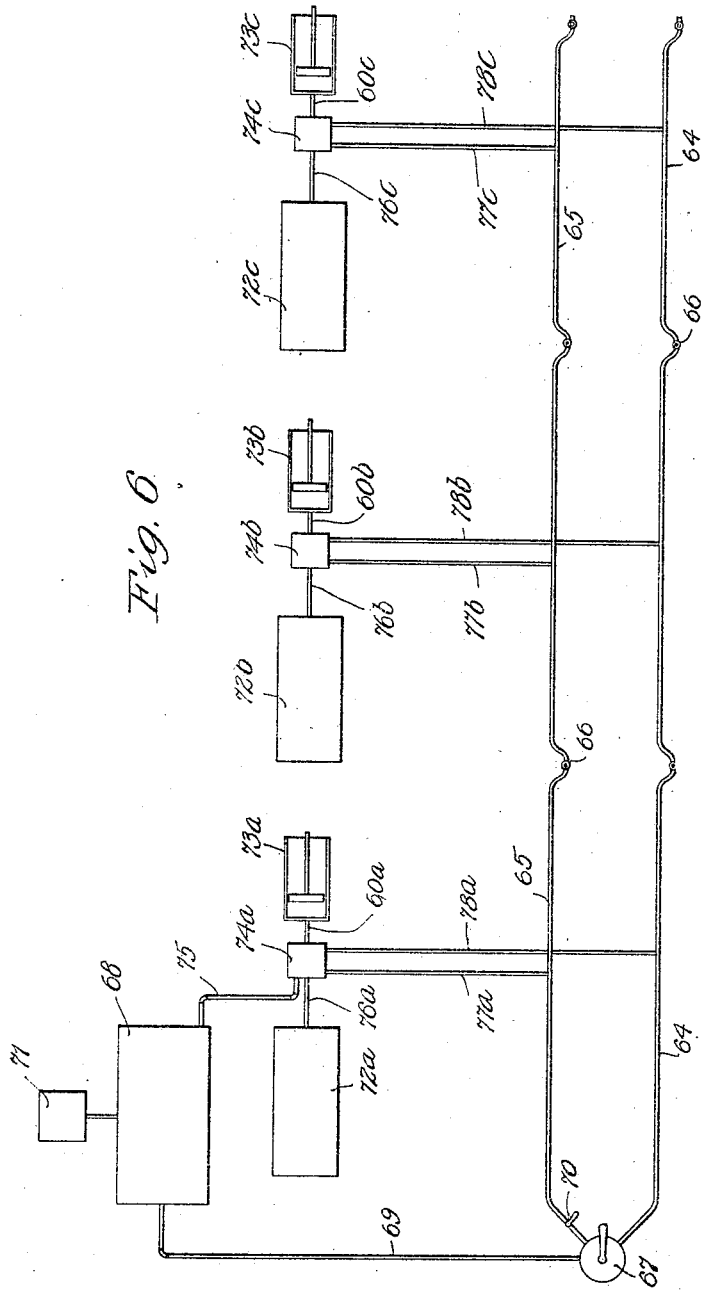

UNITED STATES PATENT OFFICE.

BERT AIKMAN, OF CHICAGO, ILLINOIS, ASSIGNOR TO NATIONAL BRAKE AND ELECTRIC COMPANY, OF MILWAUKEE, WISCONSIN, A CORPORATION OF WISCONSIN.

AUTOMATIC BRAKING SYSTEM.

No. 886,460.   Specification of Letters Patent.   Patented May 5, 1908.

Application filed October 15, 1906. Serial No. 338,930.

*To all whom it may concern:*

Be it known that I, BERT AIKMAN, a citizen of the United States, residing at Chicago, in the county of Cook and State of Illinois, have invented a certain new and useful Improvement in Automatic Braking Systems, of which the following is a full, clear, concise, and exact description, reference being had to the accompanying drawings, forming a part of this specification.

My invention relates to automatic air brake systems, particularly to an improved triple valve therefor and improved features of operation resultant upon use of such valve in air brake systems.

Triple valves used in some prior systems usually have a piston which divides the valve frame into a left and right valve chamber, the valve stem in one chamber being adapted to operate a slide valve which coöperates with ports leading from the valve frame to various pipe lines and mechanisms of the system. These pipe lines usually comprise a straight air train pipe and an emergency line pipe, and the mechanisms comprise a main and auxiliary reservoir, brake cylinders and engineer's valves. Normally and during normal operation of the braking system, the pressure in the valve compartments is equal, being at main reservoir pressure during normal operation. When anything goes wrong with the system, the operation is such that the valve stem is moved to readjust the position of the valve with respect to the ports, and the auxiliary reservoirs come into play to operate the brake cylinders to stop the train. The operation of the emergency air reservoirs depends upon the movement of the piston, and it is, therefore, very important that this piston be moved as rapidly as possible to cause such operation in order that the car may be quickly braked, if anything goes wrong. In these prior systems referred to, the system is provided with an auxiliary valve to be operated by the engineer to control the emergency pipe line whereupon one of the piston chambers is exhausted and the pistons are moved to this emergency position. In these systems, however, only one outlet is provided for the exhaust air, and where the train is of any length and the exhaust pipe consequently of great length, the resistance to air flow sometimes prevents sufficient rapid movement of the piston.

By means of the improved construction in the valve of my invention, this difficulty is entirely overcome, as two paths are provided for the escape of the exhaust air, and naturally the operation of the valve of my construction and the application of emergency brakes is much more rapid.

Another feature of my invention is the use of an auxiliary reservoir on the car which carries the main reservoir, as a result of which this car, usually the motor car or traction car, is absolutely controlled upon any mishaps to the main reservoir outfit or other parts of the system. In prior systems this was not done with the result that the motor car was practically unprotected, depending for its stopping upon the braking of the other cars coupled thereto.

These various features of my invention and also others can be best described by reference to the accompanying drawings in which Figure 1 is a side elevation of the triple valve of my invention, showing part of the brake cylinder to which it may be directly fastened, part of the valve being also in section to show some of the interior parts and construction and particularly an auxiliary inlet which forms a feature of my invention; Fig. 2 is an end view, showing the various port openings; Fig. 3 is a diametrical sectional view taken on line 3—3 of Fig. 2; Fig. 4 is a full side view of the piston and valve mechanism shown in Fig. 3; Fig. 5 is a top view of this valve mechanism, and Fig. 6 diagrammatically illustrates a braking system as applied to a train of cars.

The valve frame is substantially cylindrical in form, consisting of the main or body part 1 and the cap 2 secured thereto by bolts 3 engaging the flange 4 of the body part. The body part has the substantially cylindrical central bore 5 which extends throughout the greater part thereof, and the larger bore 6 at the left end. Between these bores is the shoulder 7 which receives the flange 8 of the bushing 9 of brass or other suitable material which lines the bore 5. The bore 6 is lined with the bushing 10, and within this bushing is disposed the valve piston 11 which divides the valve frame into the left chamber 12 and the right chamber 13. This piston is provided with a piston ring 14 in the usual manner. The hub 15 of smaller diameter than the bushing 9 extends from the piston through the chamber 13 and at its end terminates in the guiding flange 16.

The hub part 17 extends toward the left from the piston and has a threaded end for engagement by the cap 18. The hub is hollow to form a spring chamber 19 containing the compression spring 20 whose one end rests on the adjustably secured abutment 21, threading through the flange part 16 and engaged by the locking cap 22, while the other end of the spring engages the head 23 of the abutment post 24 which extends through the opening 25 in the cap 18 and normally in engagement with the head 26 which forms a chamber 27 within the valve cap 2. The spring is always under compression, and the arrangement shown tends to hold the piston to the right. As shown in Fig. 4, the hub part 15 has the flat surface 28 on which is supported a rectangular slide valve 29 having the valve pocket 30. Three ports 31, 32 and 33 are provided in the valve body which communicate through passageways 34, 35 and 36 respectively ending at the outer face 37 of the valve, as best shown in Fig. 2. Passageways 38, 39 and 40 lead through the bushing 9 and register with the ports 31, 32 and 33. The bushing 9 about these slide valves is flattened to form a seat for the slide valve which is always flexibly held thereagainst by spring action, as illustrated in Figs. 4 and 5, the slide valve being provided with ears 41 which register with lugs 42 in each of which is formed a pocket 43 for containing a compression spring 44, each spring encircling a screw whose head engages the corresponding ears and whose end threads into the lug at the base of the pocket. These springs serve to hold the valve firmly against its seat and take up all wear. Normally the valve pocket 30 connects together the ports 32 and 33, but when the piston is moved to the left to carry with it the slide valve, the pocket will connect the ports 33 and 31. The lower end of the port 31 is extended a distance toward the left, as shown, and by-pass opening 46 connects this port chamber with the right chamber 13, this by-pass being of comparatively small diameter. A horizontal passageway 47 also leads from the port 31 and opens at the left face of the valve body part 1. Another horizontal passageway 48 extends through the entire length of the body part, as best shown in Fig. 1. The cap 2 has a passageway 49 connecting the passageway 47 with the chamber 27 and thus with the left piston chamber. Another passageway 50 in the cap communicates with the passageway 48 and with the left piston chamber through the passageway 51. A washer or gasket 52 of leather or other suitable material is interposed between the cap and the body part to render the valve tight, but is provided with suitable openings so as not to interfere with communication with the various passageways. Several passageways 55 are provided in the flange 16 on the hub 15, thus connecting the right piston chamber with the exterior.

The various passageways or outlets 34, 35, 36, 48 and 55 may be connected with piping for communication with other apparatus. This may be accomplished by securing a head to the valve which has threaded openings registering with the valve openings and from which threaded openings pipes may extend, but it is customary in systems of this kind to directly attach the triple valve to brake cylinders, one way of doing this being shown in Figs. 1 and 2. The brake cylinder is represented here by 56 and the piston by 57, and the cylinder head which is represented by 58 may be secured to the cylinder end in any well known manner. This cylinder head 58 is cored out to provide various passageways whose outlets from the left thereof register with the various outlets on the valve which may be secured to the head in any suitable manner, a gasket 59, however, intervening which has openings registering with the various valve openings. The passageway 60 passes directly through the head in a position to connect the valve outlet 35 directly with the brake cylinder. The outlets 55 communicate first with the chamber 61 in the head 58 and then through outlet 62 to the edge of the head, the end of the outlet being threaded so that a pipe may be connected therein. In the same way passageways 63 communicate with the ports 31 and 32, and passageway 63' communicates with passageway 48, and these passageways lead to the outer edge of the head where they are threaded for the reception of piping.

In Fig. 6 is shown diagrammatically the various apparatus and connecting piping comprising a system for a train of cars having one motor or traction car and two trailers. Running from one end of the train to the other is a straight air train pipe 64 and an emergency pipe line 65 connected together between the various cars by couplings 66 in any suitable manner. On the traction car is placed the engineer's valve represented by 67 which connects with the straight air train pipe 64 and which communicates with the main reservoir 68 through the pipe 69. The emergency line connects with the discharge or atmosphere pipe leading from the engineer's valve, but a cock or valve 70 is inserted at the end of this pipe, as shown, and is normally closed. A pump or compressor 71 is connected with the main reservoir. On the motor car is provided the auxiliary reservoir $72^a$, a brake cylinder $73^a$, and an auxiliary valve $74^a$. The trailers have the same equipment as the motor car with the exception of the pump and main reservoir. At the first trailer, the auxiliary reservoir is represented by $72^b$, the brake cylinder by $73^b$, and the valve by $74^b$, while these parts on the second trailer are represented respectively by 72ᶜ, 73ᶜ, and 74ᶜ. The pipe 75 leads from the main reservoir to the passageway 63' in the head 58 and thence to the passageway 48 of the valve. The pipe 76ᵃ connects the auxiliary reservoir with the passageway 62 in the head 58 and from thence to the passageways 55 leading into the right valve chamber. The pipe 77 connects the emergency pipe 65 with the passageway 63 and thence it connects with the valve passageway 34 leading to the port chamber 31. The pipe 78ᵃ connects the straight air train pipe with another passageway 63 in the head 58 which communicates with the passageway 36 leading to the port chamber 33 in the valve, while, as before stated, the brake cylinder connects directly with the passageway 35 and port chamber 32 through the passageway 60 in the brake cylinder head 58. The connections for the auxiliary reservoir, valve and brake cylinder in the first trailer are the same as those in the motor car, being represented by corresponding reference characters with the subscript "b" and in the second trailer by the same reference characters with the subscript "c".

The operation of this system will be as follows:—With the engineer's valve in its normal position, the straight air train pipe will be connected with atmosphere at the engineer's valve, and the pipe 69 from the main reservoir will be closed at the engineer's valve. The rear ends of the train pipe and the emergency pipe will, of course, be closed, usually by the coupling member extending therefrom. The pump 71 being put in operation supplies compressed air to the main reservoir which passes through pipe 75 into passageway 63' and thence through valve passageways 48, 50 and 51 into the left piston chamber, as shown in Fig. 1, this air passing from this piston chamber through passageways 49 and 47 into port chamber 31, and from thence through passageway 34 and passageway 63 and pipe 77ᵃ to the emergency line, and from the emergency line the air passes into the various trailer auxiliary reservoirs. At the first trailer it passes through pipe 77ᵇ through passageway 34 of the valve thereat into port chamber 31 of said valve and through passageways 47 and 49 to the left piston chamber. At the second trailer the compressed air passes from the emergency line through a similar course. At each of the valves, however, the right piston chamber communicates with the port chamber 31 through the by-pass 46 and, therefore, the air will be under equal pressure in both piston chambers of each valve, the piston, therefore, remaining stationary in its normal position to the right. The right piston chamber and, therefore, the auxiliary reservoir on each car is normally disconnected from the brake cylinder as the slide valve blocks communication between the auxiliary reservoir inlet and the port chamber 32 and passageway 35 leading to the brake cylinder, as is clearly shown in Fig. 3. Should the motorman desire to brake the train, he moves the engineer's valve in the proper direction to connect the straight air train pipe with the pipe 69 and main reservoir whereupon compressed air will flow from the train pipe through the pipes 78ᵃ, "b" and "c" to the corresponding valves, the air flowing from these pipes through passageway 63 in the brake cylinder head and valve passageways 36 into the port chambers 33, and these port chambers being normally connected through the slide valves with the port chamber 32 which connect through passageway 35 with the brake cylinders, the brake pistons are operated to set the brakes in the well known manner, and when the system is in proper working order, there will be no operation of the valve pistons. If, however, the brakes fail to respond upon operation of the engineer's valve, the motorman or engineer immediately actuates the valve 70 to open the emergency pipe line which, as before explained, connects directly with the left piston chamber through comparatively large passageways and with the right piston chamber through the restricted by-pass openings. The left piston chambers being thus directly connected with atmosphere are almost immediately reduced to atmospheric pressure, but the reduction of the pressure of the air in the right piston chambers is retarded on account of the restricted by-pass openings, the result being a snapping of the valve pistons to the left position, the slide valve being thereby carried to its left position, as shown in dotted lines of Fig. 3. Upon such movement of the piston and valve, the piston closes the passageway 51 and, therefore, cuts off communication between the main reservoir and the left piston chamber, while the slide valves close the by-passes 46, thus cutting off communication between the right piston chambers and the port compartments 31. The direction of the flow between the valves and auxiliary reservoirs is immediately reversed upon disconnection of the main reservoir, and the compressed air in said auxiliary reservoirs flows into the right piston chamber and holds the pistons in their left position. The slide valve also exposes the respective openings to the port chambers 32 which connect with the brake cylinders, and the compressed air from the auxiliary cylinders will flow directly into the brake cylinders and the brakes will be set and the train stopped, this happening on the motor car as well as on the trailers.

It will be noticed that when the slide valve is moved to the left with the piston frame, the port chambers 31 will be connected through the valves with the port chambers 33 which connect with the straight air train pipe which normally opens to atmosphere and, therefore, the left piston chamber may exhaust through two paths, one through the emergency line pipe and the other through the straight air train pipe. This feature is novel and of very great importance. In prior systems the emergency line only was available for the exhaust outlet from the left piston cylinders and considerable resistance is necessarily offered to the flow of air from the end trailers, the result being that the valves might not respond quickly enough and braking delayed. Where the straight air train pipe is offered as an outlet in addition to the emergency pipe and these pipes are of the same diameter, the resistance will be very much decreased, and consequently the end trailer cars will be braked almost as rapidly as the head end cars. The valves will remain in their left position until the auxiliary reservoirs become exhausted or until they are released upon manipulation of the engineer's valve after the system has been repaired. To release the valves the engineer's valve is turned to connect the train pipe with the main reservoir whereupon compressed air will flow into the train pipe and through the various pipes 78$^a$, $b$ and $c$ to the valves. The air passes from these pipes into port chambers 33 which are now connected with the port chambers 31, this main reservoir air then finding its way to the left piston chamber through the passageways 47 and 49, and as soon as the pressure in these left chambers together with the pressure of the compression springs in the piston hubs becomes greater than the auxiliary pressure in the right piston chambers, the pistons are returned to their normal position. When the slide valves are thus returned to their normal positions, the port compartments 33 are again connected with the port chambers 32 and with the brake cylinders, and upon release of the engineer's valve and return to its normal position, the whole system is again in operative condition.

I shall now cite a few errors, mishaps or breaks which might occur in a system of this kind and the manner in which my improved apparatus and arrangement meets these conditions and immediately becomes effective to brake the train.

Take first the case of a break in the connection between the main reservoir and the engineer's valve, that is, in pipe 69. The left piston chamber of the valve in the motor car would, of course, almost immediately exhaust through passageways 51, 50, 48, pipe 75, reservoir 68 and through the broken pipe 69, and as the port chamber 31 of the valves on all the cars are connected together through the emergency lines, the left piston chambers will exhaust through this emergency line and through the path just traced through the valve and pipes at the motor car.

Immediately upon exhaustion of the main reservoir the pressure in the auxiliary reservoirs becomes effective to throw all the pistons to the left to thereby move the slide valves to connect the brake cylinders with the auxiliary reservoirs, thereby causing braking of the cars. As soon as the slide valves move to the left, the port chambers 31 also connect with the port chambers 33 connected with the straight air train pipe which connects with atmosphere, and the motorman also may open the valve 70 whereby three outlet paths are offered for the exhausting air from the left piston chambers. Upon repairing the pipe 69, the main reservoir pressure again becomes effective to restore the pistons and thereby the system to the normal condition. It is in a case like this just described where the importance of having an auxiliary reservoir also for the motor car is realized.

If the straight air train pipe should break at any point, the cars could not be braked in the ordinary manner, as upon manipulation of the engineer's valve the pressure from the main reservoir would pass to atmosphere instead of to the brake cylinders, and in this case the motorman again opens valve 70 whereupon the pistons are thrown to the left, as in the former case and the cars automatically braked. In the same way if the emergency line should become open to atmosphere, the valves will operate to cause braking of the cars. In the same manner the cars will be braked upon the happening of any other defects, breaks or misconnections in the system. The function of closing opening 51 by the piston when the valve is operated becomes apparent here. If the emergency line is broken or is opened to atmosphere and the opening 51 were not closed, the main reservoir would exhaust itself through the pipe 75, passageways 48, 50 and 51, through the left piston chamber, through the passageways 49 and 47 and port compartment 31, through pipe 77$^a$ and emergency pipe, and this pressure in the left piston chamber would, of course, act in opposition to the auxiliary reservoir pressure and decrease the efficiency of operation of the valve during emergency. The main reservoir is, however, immediately disconnected from the motor car valve when the piston is moved to the left to close the opening of the passageway 51 connecting the passageway 50 with the left piston chamber. Although all the valves are provided with the passageways 48, 50 and 51, these are effective only in the motor car when an auxiliary reservoir is there used. On the trailers the passageway 48 is blocked and not in use, the auxiliary reservoirs connecting directly with the right piston chamber through passageways 55. If an auxiliary reservoir is not used in the motor car, the passageway 48 would also be blocked and the main reservoir connected with the right piston chamber through the passageways 55.

A break might occur in the pipe 76ª connecting the auxiliary reservoir on the motor car with the valve, or the auxiliary reservoir might break. The main reservoir would, therefore, be connected with atmosphere through pipe 75, passageways 48, 50 and 51, left piston chamber, passageways 49 and 47 and port chamber 31, by-pass 46, right piston chamber, through passageways 55 and through pipe 76ª to atmosphere at the break or leak. This path, however, includes the by-pass opening 46 which, however, is of such restricted diameter that the pump can maintain sufficient compression in the main reservoir in spite of the leak to supply the auxiliary reservoirs to render the automatic braking system operative, and the engineer can brake the train by means of straight air in spite of the leak. This is a very important feature and is not found in prior systems.

It will be seen that after operation of the automatic valves and braking system, release of the valves cannot take place until the trouble has been found and repaired and the system rendered entirely in tact. Unless this is done, the valves cannot be returned to their normal position and the system will not operate. The engineer, however, can release the valves and brakes gradually if he desires, by proper manipulation of the engineer's valve. The engineer's valve is first moved to connect the straight air train pipe with the main reservoir to cause release of the valves as already described, whereupon the engineer's valve is moved to connect the train pipe with atmosphere, and by proper lapping of the engineer's valve, this opening of the train pipe to atmosphere can be gaged and the exhaustion of air from the brake cylinders and consequently the release of the brakes retarded as desired. This might be necessary when the car is automatically braked during descent of a hill, in which case it would be undesirable to release the brakes suddenly, but by means of my arrangement the release of the brakes can be regulated.

These various features which I have shown as resulting from my improved arrangement and construction are very desirable and important in the automatic braking field. I do not wish to be limited, however, to the exact arrangement and construction herein shown, as changes can be readily made without departing from the scope of the invention.

The claims I desire to secure by Letters Patent are the following:—

1. In an automatic raking system, the combination of a main reservoir, of a train pipe normally connected with atmosphere and adapted for connection with the reservoir, valve mechanism, a brake cylinder normally connected through the valve mechanism with the train pipe, an auxiliary reservoir connected with the valve mechanism, means for normally maintaining balance of pressure in the valve mechanism, a normally closed exhaust outlet from the valve mechanism adapted when opened to cause unbalancing of the pressure and operation of the valve mechanism to disconnect the brake cylinder from the train pipe and to connect said brake cylinder with the auxiliary reservoir, movement of said valve mechanism also causing an additional exhaust outlet therefrom through the train pipe whereby more rapid unbalancing is accomplished and therefore quicker action of the valve mechanism to connect the brake cylinder with the auxiliary reservoir.

2. In an automatic braking system, the combination with a main reservoir supplied with compressed air, of valve mechanism connected with the main reservoir, an auxiliary reservoir connected with the valve mechanism, a brake cylinder connected with the valve mechanism, a train pipe adapted for connection with the main reservoir and normally connected with the brake cylinder through the valve mechanism, a normally closed outlet from said valve, and means operable on opening of the normally closed outlet to cause operation of the valve mechanism to connect the brake cylinder with the auxiliary reservoir, operation of the valve mechanism providing an additional outlet therefrom through the train pipe.

3. In a braking system of the class described, the combination of a main reservoir supplied with compressed air, a train pipe, an engineer's valve normally connecting the train pipe with atmosphere and for connecting said pipe with the reservoir, valve mechanism, a brake cylinder normally connected with the train pipe through the valve mechanism to be directly actuated upon connection of the train pipe with the main reservoir and to exhaust upon connection of the train pipe with atmosphere, a connection between the valve mechanism and the main reservoir for normally maintaining balance of the valve mechanism, an auxiliary reservoir connected with the valve mechanism normally connected with the main reservoir to be charged thereby, normally closed means for directly connecting the valve mechanism with atmosphere to cause unbalancing thereof, said valve mechanism upon said unbalancing being actuated to disconnect the brake cylinder from the train pipe and to connect said brake cylinder with the auxiliary reservoir, movement of said valve also causing connection of said train pipe therewith to offer an additional exhaust outlet from the valve mechanism whereby its unbalancing is more rapid and consequently the connection of the brake cylinder with the auxiliary reservoir more rapidly accomplished.

4. In an automatic braking system, the combination of a main reservoir, a train pipe, automatic valve mechanism, a brake cylinder normally connected with the train pipe through said valve mechanism, an engineer's valve for connecting said train pipe with atmosphere or with the main reservoir whereby actuation of the brake cylinder may be directly caused, an auxiliary reservoir connected with the valve mechanism, a piston controlling the valve mechanism, said main reservoir being normally connected directly with both sides of the piston and with the auxiliary reservoir to maintain balance of the valve and to charge the auxiliary reservoir, a manually controlled normally closed exhaust outlet from one side of the piston, opening of said exhaust outlet causing unbalancing of the pressure and movement of the piston to cause the valve mechanism to disconnect the brake cylinder from the train pipe and to connect said cylinder with the auxiliary reservoir, movement of said valve mechanism causing said train pipe to offer an additional exhaust path from said side of the piston whereby more rapid operation of the valve mechanism is assured.

5. In an automatic braking system, the combination of the main reservoir, a train pipe normally connected with atmosphere and adapted for connection with the main reservoir, automatic valve mechanism, an auxiliary reservoir connected with said valve mechanism, a brake cylinder normally connected with the train pipe through said valve mechanism, means independent of the movement of the valve mechanism for causing unbalancing of the valve mechanism and consequent movement thereof, said valve mechanism upon movement causing connection of said train pipe to assist in the unbalancing to thereby cause more rapid movement of the valve mechanism, movement of said valve mechanism causing also the brake cylinder to be disconnected from the train pipe and connected with the auxiliary reservoir.

6. In a braking system, the combination with a valve frame divided into a left and right piston chamber by a piston frame, a slide valve in one chamber carried by the piston frame, valve ports associated with the slide valve, a brake cylinder connected with the valve frame and with one of said ports, a main reservoir, an engineer's valve controlling the connection of said main reservoir with a second port of the valve frame, said main reservoir being normally connected with both the left and right piston chambers whereby said piston frame is normally in position to hold the slide valve to connect the second and first ports together and thereby connect the main reservoir with the brake cylinder upon operation of the engineer's valve, an auxiliary reservoir connected with the valve frame, a normally closed exhaust outlet for the left piston chamber, opening of said outlet causing exhaustion of compressed air from the left piston chamber whereby the piston frame is moved to carry the slide valve to a second position to thereby disconnect the main reservoir from the brake cylinder and to connect the auxiliary reservoir with the brake cylinder, and an additional exhaust outlet for the left piston chamber, opening upon movement of said valve to the second position, said additional exhaust outlet being controlled by the engineer's valve.

7. In a braking system, the combination of a main valve frame, a piston frame dividing the main frame into a left and right piston compartment, a slide valve carried by the piston frame, ports associated with the slide valve, a brake cylinder connected with one of said ports, a main reservoir supplied with compressed air, an engineer's valve connecting a second port with the main reservoir or with atmosphere, said main reservoir being normally connected with both the left and right piston chambers whereupon said slide valve is held in position to connect the second port with the first port whereby upon operation of the engineer's valve said brake cylinder will be connected with the main reservoir, a third port connected with the left piston chamber, a normally closed exhaust outlet for the left piston chamber, an auxiliary reservoir normally connected with the main reservoir to receive compressed air therefrom, said auxiliary reservoir being connected with the right piston chamber, opening of the exhaust outlet causing exhaustion of the left piston chamber whereupon the piston frame is moved to carry the slide valve to connect the third port with the second port, movement of said valve also causing disconnection of the main reservoir from the brake cylinder and connection of the auxiliary reservoir with the brake cylinder.

8. In an air braking system, the combination of a valve frame, a piston dividing the valve frame into a left and right piston compartment, a slide valve in one compartment carried by the piston frame, ports in the valve frame associated with the valve, a by-pass between the left and right piston chambers, a brake cylinder connected with one of the ports, the second of said ports being normally connected with atmosphere, a third port being connected with the left piston chamber, a main reservoir supplied with compressed air, an engineer's valve for disconnecting said second port from atmosphere and for causing connection thereof with the main reservoir, said main reservoir being directly connected with the left piston chamber and indirectly with the right piston chamber through said by-pass whereby the pressure in the chambers is normally equal, a slide valve held in position by the piston frame to connect the second and first ports, an auxiliary reservoir normally connected with the right piston chamber to receive compressed air from the main reservoir, the auxiliary reservoir being normally disconnected from the brake cylinder by the slide valve, a normally closed exhaust outlet from the left piston chamber, the opening of said exhaust outlet causing immediate exhaustion of the left piston chamber whereby the piston frame will be moved to the left on account of the greater pressure in the right piston chamber, movement of the piston frame causing the slide valve connected thereby to connect the second port with the third port and to close the by-pass, connection of the second and third ports offering an additional exhaust outlet from the left piston chamber to atmosphere and closure of the by-pass preventing escape of the compressed air from the auxiliary reservoir, movement of the slide valve also causing disconnection of the second port from the first port and connection of the right piston chamber with the first port whereby the auxiliary reservoir is connected with the brake cylinder.

9. In an automatic braking system, the combination of a main controlling valve, a piston controlling the position of said valve, a main reservoir, an engineer's valve, a brake cylinder connected with the valve, means for normally maintaining the main reservoir pressure at both sides of the piston during which time the valve is held so that the brake cylinder may be connected with the main reservoir upon operation of the engineer's valve, a normally closed exhaust outlet adapted when opened to exhaust the compressed air from one side of the piston whereupon the slide valve is moved to prevent connection of the brake cylinder with the main reservoir, an auxiliary reservoir connected with the valve to normally receive the compressed air from the main reservoir, movement of said valve, however, causing connection of said auxiliary reservoir with the brake cylinder, and an additional outlet controlled by the engineer's valve for assisting in releasing the compressed air from the end of the piston whereby the exhaustion of air from the side of the piston is accelerated.

10. In a triple valve for use in automatic braking systems, the combination with a valve frame, a piston dividing said frame into a left and right piston chamber, a slide valve in the right chamber carried on the piston frame, a first port passageway, a second port passageway, a third port passageway connected with the left piston chamber, a by-pass between the third port passageway and the right piston chamber, said piston frame being normally held toward the right in which position the first and second port passageways are connected together by the valve so that the left and right piston chambers are connected together, movement of the piston frame to the left causing movement of the valve to connect the second and third port passageways and to close the by-pass.

11. In a triple valve for use in an automatic braking system, the combination of a valve body, a piston adapted to reciprocate and driving said body into a left and right piston chamber, a slide valve in the right piston chamber carried by the piston frame, a valve seat having ports leading therefrom to the outside of the valve frame, means for holding the piston frame in a normal position, said slide valve during the normal position of the piston frame being held thereby to establish a connection between the first and second ports and to disconnect the right piston chamber from the first port, a third port being connected with the left piston chamber, a normally open by-pass between the piston chambers, movement of said piston frame from its normal position causing the valve to be carried to close the by-pass and to connect the right piston chamber with the first port and also to connect the second and third ports together.

12. In a triple valve for use in automatic braking systems, the combination of a valve body, a piston dividing the body into a left and right piston chamber, a slide valve in the right compartment carried by the piston frame, a valve seat for the valve and ports extending therefrom to the exterior of the valve frame, adjustable spring means for normally holding the piston in a normal position, said valve during said normal position connecting together the first and second ports and closing the third port, said valve during its normal position also closing communication between the right piston chamber and the ports, a restricted by-pass normally connecting together the piston chambers, said left piston chamber being normally connected with the exterior of the valve frame, movement of said piston to its abnormal position causing movement of the slide valve to disconnect the second port from the first port and to connect second port with the third port, movement of said valve also causing connection between the right piston chamber and the first port and closure of the by-pass, and means for disconnecting the left piston chamber from the exterior of the valve frame upon movement of the piston frame to its abnormal position.

13. In a triple valve for use in braking systems comprising a valve frame, a piston frame dividing the valve frame into a left and right compartment, a slide valve in the right compartment carried by the piston frame and associated with suitable port outlets, passageways connecting the left piston chamber with the exterior of the valve frame through one of said ports, additional passageways normally connecting the left piston chamber with the exterior of the valve frame, movement of the piston frame and valve carried thereby causing an additional connection of the left piston chamber with the exterior of the valve frame by way of the slide valve, movement of the piston frame also causing closure of the additional passageway which normally connected the left piston chamber with the exterior of the valve frame.

14. In an automatic braking system, the combination of a main reservoir, automatic valve mechanism, an auxiliary reservoir connected with the valve mechanism, a brake cylinder connected with the valve mechanism, an engineer's valve controlling the connection of the main reservoir with the valve mechanism, means independent of the movements of the valve mechanism for causing unbalancing and movement thereof, and additional means controlled by the engineer's valve and rendered operative upon movement of the valve mechanism to assist in the unbalancing to thereby cause more rapid movement of the valve mechanism, said brake cylinder being connected with the auxiliary reservoir upon movement of the valve mechanism.

In witness whereof, I hereunto subscribe my name this 9th day of October A. D. 1906.

BERT AIKMAN.

Witnesses:
CHARLES J. SCHMIDT,
ARTHUR H. BOETTCHER.